United States Patent
Chun et al.

(10) Patent No.: US 9,371,090 B2
(45) Date of Patent: Jun. 21, 2016

(54) STEERING LINKAGE STRUCTURE OF REAR WHEEL STEERING DEVICE

(71) Applicant: Hyundai Motor Company, Seoul (KR)

(72) Inventors: JoonWon Chun, Seoul (KR); Min Chul Shin, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/489,134

(22) Filed: Sep. 17, 2014

(65) Prior Publication Data

US 2015/0183461 A1 Jul. 2, 2015

(30) Foreign Application Priority Data

Dec. 31, 2013 (KR) ........................ 10-2013-0168488

(51) Int. Cl.
*B62D 5/04* (2006.01)
*B62D 7/16* (2006.01)
*B62D 7/22* (2006.01)
*B62D 7/15* (2006.01)

(52) U.S. Cl.
CPC .............. *B62D 7/163* (2013.01); *B62D 5/0445* (2013.01); *B62D 7/1581* (2013.01); *B62D 7/228* (2013.01)

(58) Field of Classification Search
CPC ...... B62D 5/0445; B62D 7/163; B62D 7/228; B62D 7/1581
USPC .......................................................... 180/445
See application file for complete search history.

(56) References Cited

U.S. PATENT DOCUMENTS

| 5,248,009 A * | 9/1993 | Takehara ............. B62D 7/1581 180/404 |
| 6,041,886 A * | 3/2000 | Nakaishi .............. B62D 5/0427 180/443 |
| 2011/0303480 A1* | 12/2011 | Shimizu ................... B62D 1/16 180/444 |
| 2012/0199413 A1* | 8/2012 | Fujinori ................... B62D 3/12 180/445 |

FOREIGN PATENT DOCUMENTS

| JP | 9-193824 A | 7/1997 |
| JP | 2002-331955 A | 11/2002 |
| JP | 2011-111040 A | 6/2011 |

* cited by examiner

*Primary Examiner* — Tony Winner
(74) *Attorney, Agent, or Firm* — Morgan, Lewis & Bockius LLP

(57) ABSTRACT

A steering linkage structure of a rear wheel device may include a housing receiving a screw nut integrally and rotatably connected to a driving motor, a steering shaft inserted in the housing and having a lead portion coupled to the screw nut that rotates and being movable left and right in the housing by the screw nut, and linkages coupled to the steering shaft to connect both ends of the steering shaft to rear wheels, in which coupling portions where the linkages are coupled to the steering shaft are inserted and protrude into and out of the housing, such that when a bending load is applied, the coupling portions support the bending load and are in contact with the housing.

5 Claims, 5 Drawing Sheets

STEERING LINKAGE STRUCTURE OF REAR WHEEL STEERING DEVICE

CROSS-REFERENCE TO RELATED APPLICATION

The present application claims priority to Korean Patent Application No. 10-2013-0168488 filed Dec. 31, 2013, the entire contents of which is incorporated herein for all purposes by this reference.

BACKGROUND OF THE INVENTION

1. Field of the Invention

The present invention relates to a steering linkage structure of a rear wheel steering device. More particularly, the present invention relates to a steering linkage structure of a rear wheel steering device which can increase bending strength and reduce the lead diameter and the capacity of a driving motor.

2. Description of Related Art

In general, rear wheel steering devices of vehicles, devices for controlling the direction of the rear wheels of vehicle in accordance with the driving situations of the vehicles, reduces the turning radius of a vehicle by controlling the direction of the rear wheels opposite to the direction of front wheels when the vehicle is driven at a low speed, and improves driving stability by controlling the rear wheel in the same direction as the front wheel when the vehicle is driven at a high speed.

FIG. 1 shows an example of a rear wheel steering device according to the related art. The rear wheel steering device includes driving motor 100 in a housing, a screw nut 110 rotated by power from the driving motor 100, a steering shaft 120 reciprocated to the left and right by the rotation of the screw nut 110, and a linkage 140 coupled to both ends of the steering shaft 120 through ball joints 130, connected with rear wheels (not shown), and controlling the direction of the rear wheels.

A lead 125 is formed on the steering shaft 120 for engagement with the screw nut 110.

In the rear wheel steering device having the structure of the related art, however, the diameter of the steering shaft 120 is set in consideration of a bending load inputted through the linkage 140 and the lead 125 diameter needs to be set larger than the diameter of the steering shaft 120 in consideration of engagement between the lead 125 and the screw nut 110.

Accordingly, since the lead diameter is set large in consideration of the bending load, it is required to increase the output of the driving motor 100 with the increase in the lead diameter, which increases the weight and the manufacturing cost.

As another example of rear wheel steering devices according to the related art for solving the problems, a steering shaft is divided into two, left and right steering shafts, in which the lead diameter of any one of the steering shafts is set as small as possible and the two steering shafts are engaged with a diameter smaller than the lead diameter.

In the different type of rear wheel steering device of the related art, since the steering shaft with the lead is combined with a screw nut and then the other one is bolted to the steering shaft, the assembly ability is improved.

However, since the diameter of the coupling portion of the left and right steering shafts is smaller than the lead diameter, it is weak to buckling due to the axial load in the steering shafts.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a steering linkage structure of a rear wheel steering device of which the diameter of the steering shaft and the lead diameter can be designed as small as possible regardless of a bending strength, and accordingly, which makes it possible to reduce the capacity of the driving motor and has a strength against a buckling load of the steering shaft, by having a linkage that is connected to both ends of the steering shaft and capable of supporting a bending strength.

In an aspect of the present invention, a steering linkage structure of a rear wheel device may include a housing receiving a screw nut integrally and rotatably connected to a driving motor, a steering shaft inserted in the housing and having a lead portion coupled to the screw nut that rotates and being movable left and right in the housing by the screw nut, and linkages coupled to the steering shaft to connect both ends of the steering shaft to rear wheels, in which coupling portions where the linkages are coupled to the steering shaft are inserted and protrude into and out of the housing, such that when a bending load is applied, the coupling portions support the bending load in contact with the housing.

The steering shaft may have a small-diameter portion with a diameter smaller than a diameter of the lead portion, positioned at a side of the lead portion in the longitudinal direction, and a large-diameter portion with a diameter the same as or larger than the diameter of the lead portion, positioned at an opposite side of the lead portion in the longitudinal direction.

The steering shaft and the linkage may be bolted or fastened with a screw.

A threaded tap may be formed at both ends of the steering shaft and a tap hole in which the threaded tap is inserted and thread-fastened may be formed in the coupling portion of the linkage.

A groove may be formed longitudinally around each of an inner circumference of the coupling portion of the linkage and an outer circumference of the steering shaft.

A bushing may be fitted on the steering shaft, and projections inserted in the groove of the coupling portion of the linkage and the groove of the steering shaft may be formed on the bushing.

When the linkage is a ball linkage with a ball, the tap hole may be formed on a ball housing where the ball is received.

A lock nut may be additionally thread-fastened to the threaded tap.

The lock nut may have a T-shape.

Various aspects of the present invention provide for a lead portion with a lead thread formed longitudinally on a steering shaft and a small-diameter portion with a diameter smaller than a diameter of the lead portion formed at one side from the lead portion, which may facilitate assembly of a steering linkage structure of a rear wheel steering device.

Further, since the large-diameter portion with a diameter the same as or larger than the diameter of the lead portion is formed at the opposite side from the lead portion, it is possible to secure a strength against an axial load on the steering shaft and solve the buckling problem.

Further, when a bending load is applied to the linkages connected to both ends of the steering shaft, the linkages can support the bending load in contact with the housing, such that it is possible to reduce the diameter of the lead portion as small as possible regardless of buckling and it is also possible to reduce the capacity of the driving motor. Accordingly, it is possible to solve problems due to heat by the driving motor and reduce the weight and manufacturing cost, which is advantageous in layout.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
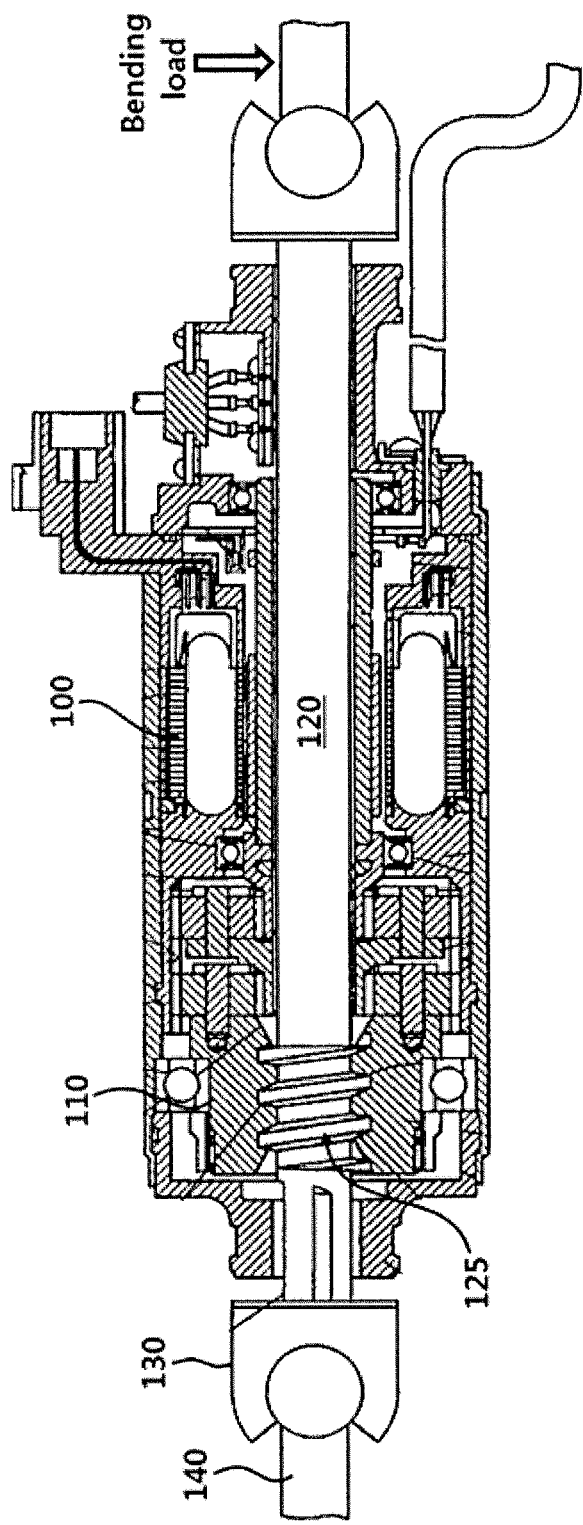
FIG. 1 is a schematic cross-sectional view of a rear wheel steering device according to the related art.
Figure 2:
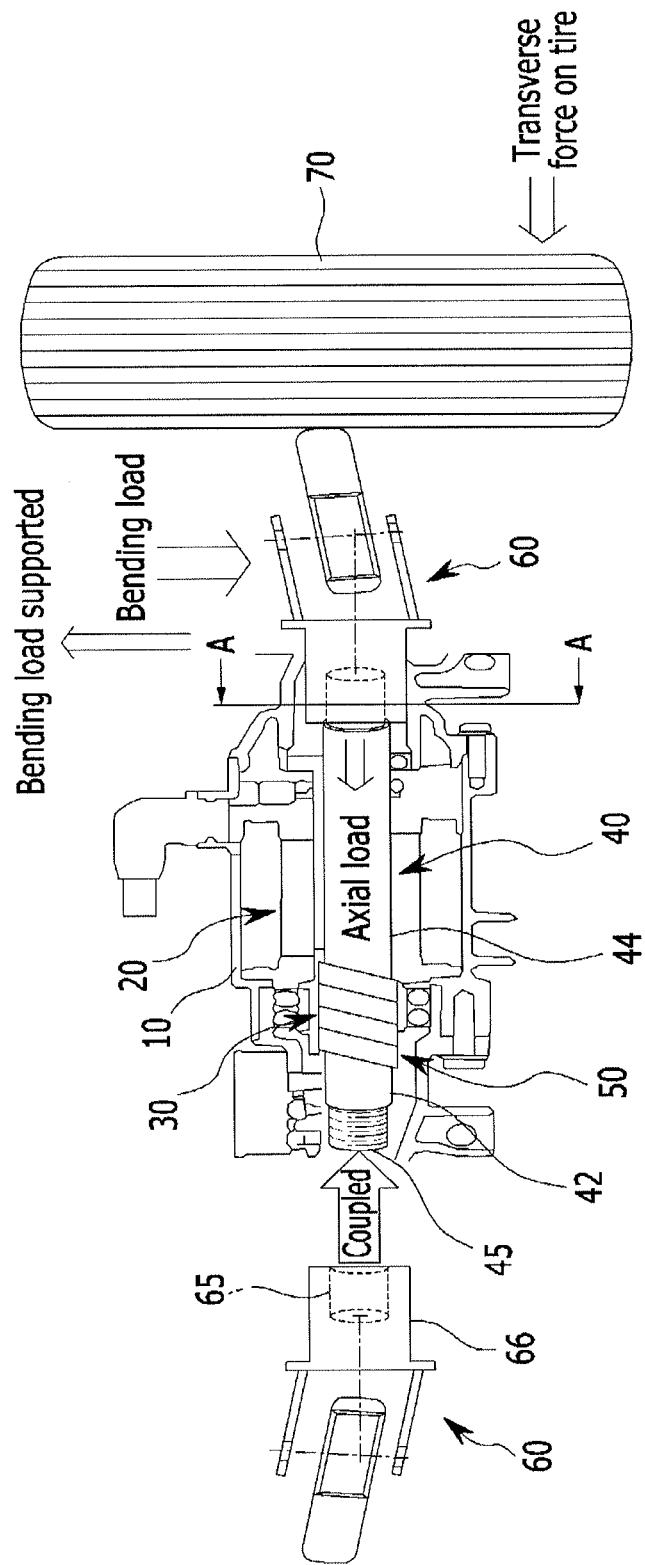
FIG. 2 is a schematic cross-sectional view of an exemplary steering linkage structure of a rear wheel steering device according to the present invention.

Referring to FIG. 2, a steering linkage structure of a rear wheel steering device according to various embodiments of the present invention may include a housing 10 having a substantially cylindrical shape, a driving motor 20 generating torque in the housing 10, and a screw nut 30 integrally and rotatably connected to the driving motor 20 and supported rotatably through a bearing in the housing 10.

A steering linkage structure of a rear wheel steering device according to various embodiments of the present invention may include a steering shaft 40 inserted in the housing in mesh with the screw nut 30.

A lead portion 50 with a lead coupled to the screw nut 30 is formed at a longitudinally predetermined portion of the steering shaft 40.

Linkages 60 connected with the rear wheels 70 are coupled to both ends of the steering shaft 40.

A threaded tap 45 is formed at both ends of the steering shaft 40 for coupling of the steering shaft 40 and the linkage 60 and a tap hole 65 is formed inside the linkage 60, such that the threaded tap 45 can be inserted and bolted in the tap hole 65.

A small-diameter portion 42 with a diameter smaller than the diameter of the lead portion 50 is formed at a side from the lead portion 50 of the steering shaft 40, so assembly ability can be secured.

A large-diameter portion 44 with a diameter the same as or larger than the diameter of the lead portion 50 is formed at the opposite side of the lead portion 50 of the steering shaft 40 from the small diameter portion 42, such that when a transverse force exerted in a rear wheel 70 when the vehicle is in motion acts as an axial load on the steering shaft 40 through the linkage 60, the large-diameter portion 44 sufficiently supports the axial load and the buckling problem with the steering shaft 40 can be solved.

Coupling portions 66 of the linkages 60 which are coupled to both ends of the steering shaft 40 are partially inserted in the housing 10 with the other portions outside the housing 10, such that when a bending load is applied to the linkage 60 due to an external force applied to the rear wheels 70, the coupling portions 66 of the linkage 60 are supported in contact with the housing 10 and can support the bending load.

Accordingly, since a bending load applied to the steering shaft 40 can be appropriately supported by the linkages 60, there is no need of considering the problem of a bending housing when designing the steering shaft 40, such that it is possible to set the diameters of the steering shaft 40 and the lead portion 50 as small as possible. Therefore, it is possible to reduce the capacity of the driving motor 20 and solve the problem due to heat by the driving motor, and thus, it is possible to reduce the weight and manufacturing cost of the rear wheel steering device.

Figure 3:
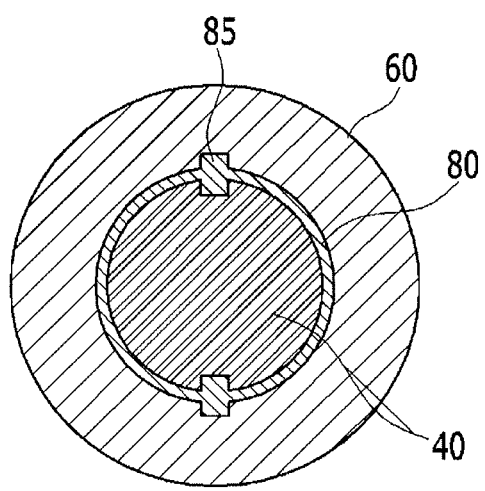
FIG. 3 is a cross-sectional view taken along line A-A in FIG. 2.

Referring to FIG. 3, the steering shaft 40 and the linkage 60 are bolted, but a groove is radially formed around an inner circumference of the coupling portion 66 of the linkage 60 fitted in the steering shaft 40 and around an outer circumference of the threaded tap 45 of the steering shaft 40, a bushing 80 is fitted on the steering shaft 40, and projections 85 inserted in the groove of the linkage 60 and the groove of the steering shaft 40 are formed radially inward and outward on the bushing 80, such that the steering shaft 40 and the linkage 60 are integrally combined without relative rotation.

The bushing 80 and the projections 85 prevent the steering shaft 40 and the linkage 60 from being loosened and prevent the steering shaft 40 from rotating relative to the linkage 60.

Figure 4:
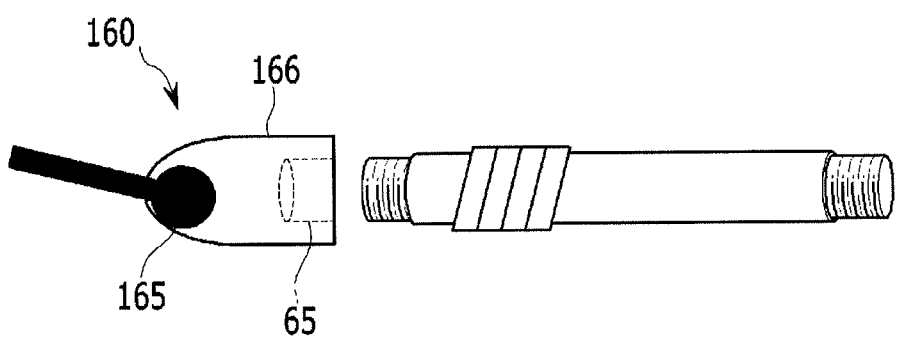
FIG. 4 is an exploded front view of an exemplary steering linkage structure of a rear wheel steering device according to the present invention.

Referring to FIG. 4, when the linkage 60 is a ball linkage 160 with a ball 165, it is possible to make the linkage support a bending load in contact with the housing 10 by forming a threaded tap hole 65 on the ball housing 166 receiving the ball 165 and giving the ball housing 165 sufficient length and diameter.

Figure 5:
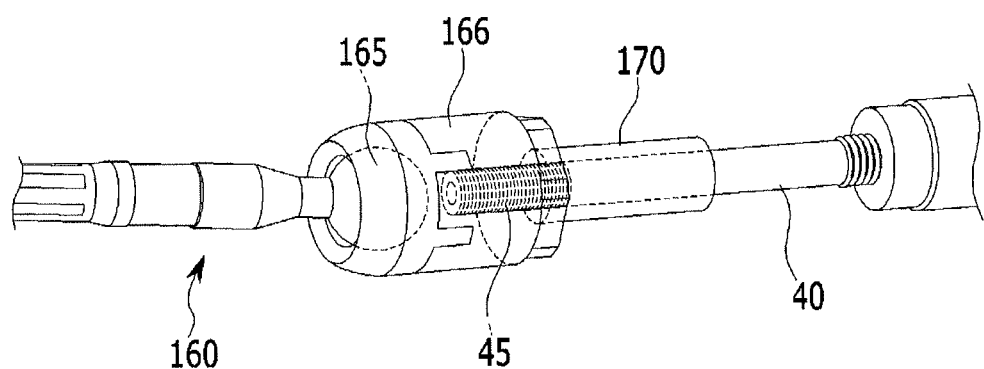
FIG. 5 is an assembled front view of an exemplary steering linkage structure of a rear wheel steering device according to the present invention.

Referring to FIG. 5, it is possible to additionally secure fastening torque between the linkage and the steering shaft, using a lock nut 170 instead of the bushing 80.

The when the lock nut 170 is a T-shaped lock nut, as shown in the figures, there is an effect of increasing the diameter of the threaded tap 45 of the steering shaft which allows the steering shaft to be fastened to the ball housing 165.

Obviously, common flat type lock nuts may be used instead of the T-shaped lock nut 170 and other shapes may be used for the lock nut depending on various factors.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A steering linkage structure of a rear wheel device, comprising:
    a housing receiving a screw nut integrally and rotatably connected to a driving motor;
    a steering shaft inserted in the housing and having a lead portion coupled to the screw nut that rotates, the steering shaft being movable left and right in the housing by the screw nut;
    linkages coupled to the steering shaft to connect both ends of the steering shaft to rear wheels,
    wherein:
        coupling portions where the linkages are coupled to the steering shaft are inserted and protrude into and out of the housing, such that when a bending load is applied, the coupling portions support the bending load and are in contact with the housing,
        the steering shaft and the linkage are fastened with a screw, and
        a threaded tap is formed at both ends of the steering shaft, and a tap hole in which the threaded tap is inserted and thread-fastened is formed in the coupling portion of the linkage;
    a groove formed longitudinally around each of an inner circumference of the coupling portion of the linkage and an outer circumference of the steering shaft;
    a bushing fitted on the steering shaft; and
    projections formed on the bushing and inserted in the groove of the coupling portion of the linkage and the groove of the steering shaft.

2. The steering linkage structure of claim 1, wherein the steering shaft comprises:
    a small-diameter portion with a diameter smaller than a diameter of the lead portion, positioned at a side of the lead portion in the longitudinal direction; and
    a large-diameter portion with a diameter the same as or larger than the diameter of the lead portion, positioned at an opposite side of the lead portion in the longitudinal direction.

3. The steering linkage structure of claim 1, wherein when the linkage is a ball linkage with a ball, the tap hole is formed on a ball housing where the ball is received.

4. The steering linkage structure of claim 1, wherein a lock nut is additionally thread-fastened to the threaded tap.

5. The steering linkage structure of claim 4, wherein the lock nut has a T-shape.

\* \* \* \* \*